(12) United States Patent
Gray et al.

(10) Patent No.: US 8,726,092 B1
(45) Date of Patent: May 13, 2014

(54) IDENTIFYING CAUSES OF APPLICATION CRASHES

(75) Inventors: Jessica Lynn Gray, Seattle, WA (US); Michael Noth, Bothell, WA (US); James Kason Keiger, Seattle, WA (US); Siyang Xie, Redmond, WA (US)

(73) Assignee: Google Inc., Mountain View, CA (US)

( * ) Notice: Subject to any disclaimer, the term of this patent is extended or adjusted under 35 U.S.C. 154(b) by 345 days.

(21) Appl. No.: 13/360,617

(22) Filed: Jan. 27, 2012

Related U.S. Application Data (60) Provisional application No. 61/581,593, filed on Dec. 29, 2011.

(51) Int. Cl.
*G06F 11/00* (2006.01)

(52) U.S. Cl.
USPC ..................... 714/38.1; 714/38.14

(58) Field of Classification Search
CPC  G06F 11/079; G06F 11/302; G06F 2201/865
USPC ............................ 714/38.1, 38.14
See application file for complete search history.

(56) References Cited

U.S. PATENT DOCUMENTS

| | | | |
|---|---|---|---|
| 2002/0087949 A1* | 7/2002 | Golender et al. | 717/124 |
| 2004/0073844 A1* | 4/2004 | Unkle et al. | 714/39 |
| 2004/0078695 A1* | 4/2004 | Bowers et al. | 714/39 |
| 2005/0120273 A1* | 6/2005 | Hudson et al. | 714/38 |
| 2006/0271591 A1* | 11/2006 | Murphy et al. | 707/103 R |
| 2007/0101324 A1* | 5/2007 | Lupu et al. | 718/1 |
| 2007/0285578 A1* | 12/2007 | Hirayama et al. | 348/700 |
| 2009/0292941 A1* | 11/2009 | Ganai et al. | 714/2 |
| 2010/0100774 A1* | 4/2010 | Ding et al. | 714/45 |
| 2010/0325490 A1* | 12/2010 | Anvin et al. | 714/37 |
| 2011/0066908 A1* | 3/2011 | Bartz et al. | 714/746 |
| 2012/0137182 A1* | 5/2012 | Zhang et al. | 714/48 |

OTHER PUBLICATIONS

Booth, Simon P. et al., "Walk Backwards to Happiness—Debugging by Time Travel", Technical Report CCM-143, Department of Computing Science and Mathematics, University of Stirling, Scotland, pp. 1-11, (Jul. 1997).
"Description of the Dr. Watson for Windows (Drwtsn32.exe) Tool", <http://web.archive.org/web/20090618193734/http://support.microsoft.com/kb/308538> (Oct. 29, 2007).
King, Samuel T. et al., "Debugging operating systems with time-traveling virtual machines", USENIX Annual Technical Conference, pp. 1-15 (2005).
Larson, Mark, "Google Chrome Release Channels", The Chromium Blog—News and developments from the open source browser project, <http://web.archive.org/web/20090116183046/http://blog.chromium.org/> (Jan. 8, 2009).
"Airbag, Google Crash Reporter", Google Operating System—Unofficial news and tips about Google, <http://web.archive.org/web/20070102125314/http://googlesystem.blogspot.com/2006/12/airbag-google-crash-reporter.html> (Dec. 27, 2006).

* cited by examiner

*Primary Examiner* — Chae Ko
(74) *Attorney, Agent, or Firm* — McDermott Will & Emery LLP (57) ABSTRACT

The subject matter of this specification can be implemented in, among other things, a computer-implemented method for identifying causes of application crashes. The method includes receiving crash reports from multiple computing devices resulting from a problem that occurs in an application in operation at the computing devices. The crash reports include sets of properties that describe system states of the computing devices where the problem occurred. The method further includes identifying similarities between one or more properties in the sets of properties from the crash reports. The method further includes identifying differences between one or more properties in the sets of properties from the crash reports. The method further includes identifying one or more candidates for a cause of the problem in the application based on a clustering of the similarities and the differences. The method further includes generating a report that includes the one or more candidates.

18 Claims, 3 Drawing Sheets

IDENTIFYING CAUSES OF APPLICATION CRASHES

CROSS-REFERENCE TO RELATED APPLICATIONS

This application claims the benefit of U.S. Provisional Application No. 61/581,593, filed on Dec. 29, 2011, and entitled "Identifying Causes of Application Crashes," which is incorporated herein by reference.

TECHNICAL FIELD

This instant specification relates to identifying causes of crashes in applications.

BACKGROUND

Oftentimes when an application encounters a problem that results in an abnormal termination of the application, such as a crash, a crash reporter will collect a dump of information related to the crash. The dump of information can include, for example, contents of memory that were accessible by the application and a state of a processor that was executing instructions from the memory. In some cases, a user can opt to allow the crash reporter to provide the dump of information to an entity that is responsible for the application, such as a company that developed the application. The company can then use the dump of information to diagnose and fix the problem that caused the crash.

SUMMARY

In one aspect, a computer-implemented method for identifying causes of application crashes includes receiving crash reports from multiple computing devices resulting from a problem that occurs in an application in operation at the computing devices. The crash reports include sets of properties that describe system states of the computing devices where the problem occurred. The method further includes identifying similarities between one or more properties in the sets of properties from the crash reports. The method further includes identifying differences between one or more properties in the sets of properties from the crash reports. The method further includes identifying one or more candidates for a cause of the problem in the application based on a clustering of the similarities and the differences. The method further includes generating a report that includes the one or more candidates.

Implementations can include any, all, or none of the following features. The sets of properties can include memory stacks. Identifying the similarities can include identifying contents of the memory stacks that the sets of properties have in common. Identifying the differences can include identifying contents of the memory stacks that the sets of properties do not have in common. The memory stacks can include memory stacks of threads in the application other than a thread in which the problem occurred. The sets of properties can identify external modules accessed by the application. Identifying the similarities can include identifying ones of the external modules that the sets of properties have in common. Identifying the differences can include identifying ones of the external modules that the sets of properties do not have in common. The external modules can include one or more of drivers, plug-ins, extensions, and application program interfaces. The sets of properties can identify other applications in operation at the computing devices. Identifying the similarities can include identifying ones of the other applications that the sets of properties have in common. Identifying the differences can include identifying ones of the other applications that the sets of properties do not have in common. The sets of properties can identify operating systems in operation at the computing devices. Identifying the similarities can include identifying ones of the operating systems that the sets of properties have in common. Identifying the differences can include identifying ones of the operating systems that the sets of properties do not have in common. The sets of properties can identify processor architectures in operation at the computing devices. Identifying the similarities can include identifying ones of the processor architectures of the operating systems that the sets of properties have in common. Identifying the differences can include identifying ones of the processor architectures of the operating systems that the sets of properties do not have in common. The sets of properties can identify data within the application in operation at the computing devices. Identifying the similarities can include identifying portions of the data that the sets of properties have in common. Identifying the differences can include identifying portions of the data that the sets of properties do not have in common.

In one aspect, a computer-implemented system for identifying causes of application crashes includes an interface that receives crash reports from multiple computing devices resulting from a problem that occurs in an application in operation at the computing devices. The crash reports include sets of properties that describe system states of the computing devices where the problem occurred. The system further includes a memory that stores the sets of properties from the crash reports. The system further includes a crash report module that identifies similarities between one or more properties in the sets of properties from the crash reports, identifies differences between one or more properties in the sets of properties from the crash reports, identifies one or more candidates for a cause of the problem in the application based on a clustering of the similarities and the differences, and generates a report that includes the one or more candidates.

Implementations can include any, all, or none of the following features. The sets of properties can include memory stacks. The crash report module can identify the similarities by identifying contents of the memory stacks that the sets of properties have in common, and can identify the differences by identifying contents of the memory stacks that the sets of properties do not have in common. The memory stacks can include memory stacks of threads in the application other than a thread in which the problem occurred. The sets of properties can identify external modules accessed by the application. The crash report module can identify the similarities by identifying ones of the external modules that the sets of properties have in common, and can identify the differences by identifying ones of the external modules that the sets of properties do not have in common. The external modules can include one or more of drivers, plug-ins, extensions, and application program interfaces. The sets of properties can identify other applications in operation at the computing devices. The crash report module can identify the similarities by identifying ones of the other applications that the sets of properties have in common, and can identify the differences by identifying ones of the other applications that the sets of properties do not have in common. The sets of properties can identify operating systems in operation at the computing devices. The crash report module can identify the similarities by identifying ones of the operating systems that the sets of properties have in common, and can identify the differences by identifying ones of the operating systems that the sets of properties do not have in common. The sets of properties can identify processor architectures in operation at the computing devices. The crash report module can identify the similarities by identifying ones of the processor architectures of the operating systems that the sets of properties have in common, and can identify the differences by identifying ones of the processor architectures of the operating systems that the sets of properties do not have in common. The sets of properties can identify data within the application in operation at the computing devices. The crash report module can identify the similarities by identifying portions of the data that the sets of properties have in common, and can identify the differences by identifying portions of the data that the sets of properties do not have in common.

The details of one or more implementations are set forth in the accompanying drawings and the description below. Other features and advantages will be apparent from the description and drawings, and from the claims.

DETAILED DESCRIPTION

This document describes systems and techniques for identifying causes of crashes in applications. Crash reports are received from applications in operation at computing devices. Each crash report includes information that describes a state of the computing device at which the crash of the application occurred. The state information is analyzed to identify similarities and differences between the states of the computing devices at the time of the crashes of the application. The similarities and differences are then used to identify causes of the crashes.

Figure 1:
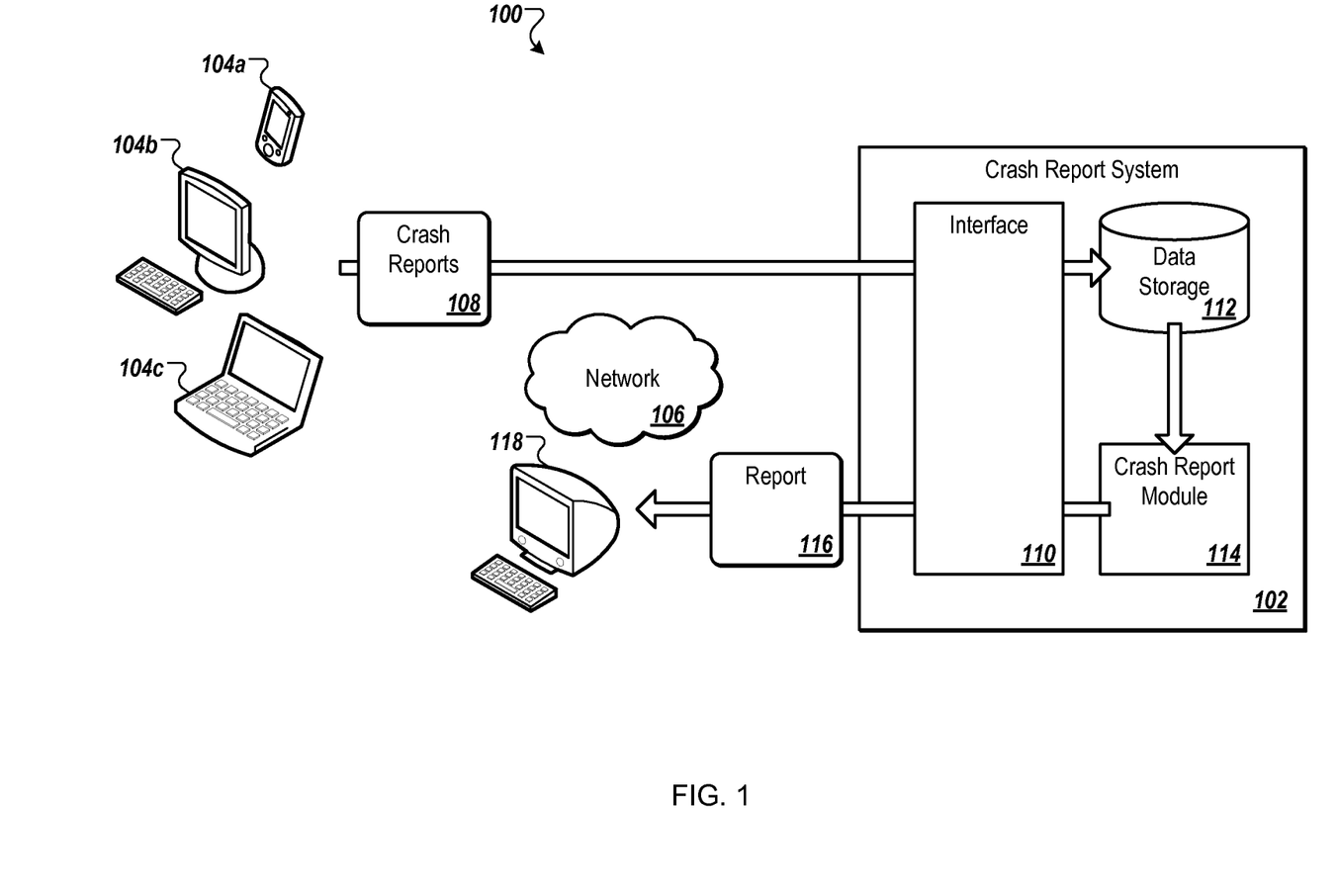
FIG. 1 is a schematic diagram that shows an example of a system for identifying causes of crashes in applications.

FIG. 1 is a schematic diagram that shows an example of a system 100 for identifying causes of crashes in applications. The system 100 includes a crash report system 102 in communication with multiple computing devices 104a-c over a network 106. Each of the computing devices 104a-c has an application in operation at the respective computing device. The application at the computing devices 104a-c may be, for example, the same application, one or more versions of the same application, and/or the same application compiled for one or more different combinations of operating systems and hardware. At one or more of the computing devices 104a-c, the application experiences a fault or problem that causes the application to crash. A crash may be, for example, an abnormal termination of the application, such as when an operating system terminates an application that attempts to access memory that the application is not permitted to access, the application becomes unresponsive, or the applications consumes more resources than what is allowed by the operating system. The ones of the computing devices 104a-c at which the application crashes submit one or more crash reports 108 to the crash report system 102.

The crash report system 102 includes an interface 110 for communicating with the network 106 and computing devices in communication with the network 106. The crash report system 102 receives the crash reports 108 through the interface 110. The crash report system 102 can, in some implementations, receive the crash reports 108 over time and store the crash reports 108 in a data storage 112 for subsequent processing.

The crash report system 102 includes a crash report module 114 that retrieves the crash reports 108 from the data storage 112 and processes the crash reports 108. In particular, the crash report module 114 analyzes the crash reports 108 to identify similarities and differences in the crash reports 108. The crash report module 114 then determines whether any of the differences may be ruled out as possible causes of the crashes and whether any of the similarities may be possible causes of the crashes. The crash report module 114 may then generate a report 116 based on the possible causes of the crashes and may provide the report 116 to a user at a computing device 118 on the network 106. While represented in FIG. 1 as including three computing devices, in general, the application may be installed at and the crash report module 114 may process crash reports from more than three computing devices.

Figure 2:
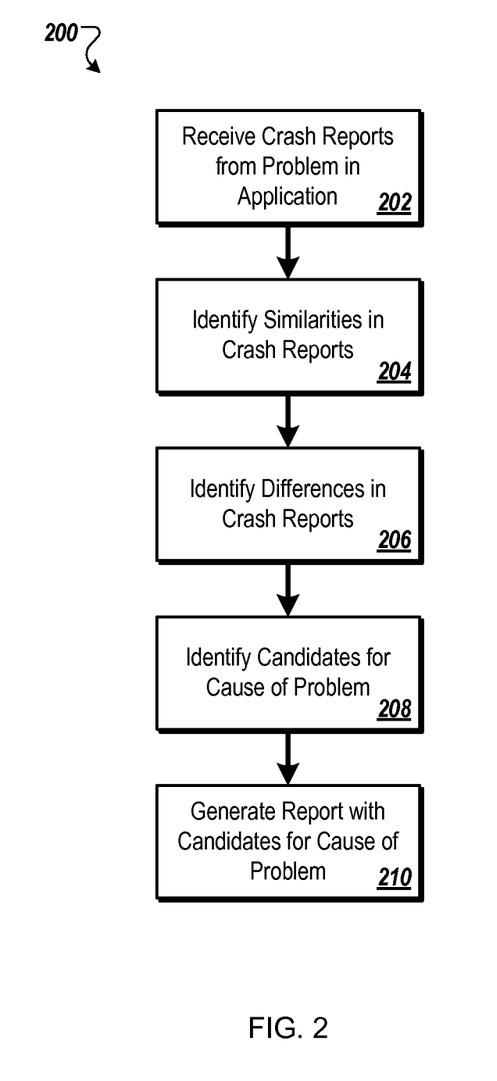
FIG. 2 is flow chart that shows an example of a process for identifying causes of crashes in applications.

FIG. 2 is flow chart that shows an example of a process 200 for identifying causes of crashes in applications. The process 200 may be performed, for example, by a system such as the system 100. For clarity of presentation, the description that follows uses the system 100 as an example for describing the process 200. However, another system, or combination of systems, may be used to perform the process 200.

In step 202, crash reports are received that resulted from a problem that occurred in an application in operation at multiple computing devices. The crash reports include sets of properties that describe system states of the computing devices where the problem occurred. For example, each set of properties in the crash reports 108 may include one or more of a memory stack of a thread that crashed, memory stacks of threads in the application other than the thread that crashed, names and/or versions of external modules accessed by the application and/or in use at the computing device, identification of hardware and peripherals in use at the computing device, and data from within the application.

The external modules may include, for example, an operating system, other applications, drivers, plug-ins, extensions, and/or application program interfaces. The data from within the application can include, for example, content received and/or transmitted by the application, such as Hyper-Text Markup Language (HTML), scripting language, text, images, audio, and/or video. In another example, the data from within the application can include a path and/or network address accessed by the application or a module used by the application, such as a file name, a file path, a hostname, a Uniform Resource Locator (URL), and/or an Internet Protocol (IP) address.

The identification of hardware and peripherals may include, for example, a name of a type of central processing unit (CPU) used by the computing device (e.g., x86 or ARM) and/or a specific version within a type of architecture (e.g., a particular processor within the x86 family). In some implementations, one or more of the external modules are specifically compiled or otherwise generated for the particular hardware or peripheral.

In step 204, similarities are identified between one or more properties in the sets of properties from the crash reports. For example, the crash report module 114 may identify similarities in contents of the memory stacks between the sets of properties. Identifying the similarities may include identifying ones of the external modules that the sets of properties have in common. Identifying the similarities may include identifying ones of the other applications that the sets of properties have in common. Identifying the similarities may include identifying ones of the operating systems that the sets of properties have in common. Identifying the similarities may include identifying portions of the data that the sets of properties have in common. For example, the crash report module 114 may determine that the crashes in the crash reports occurred within the same type of operating system and/or within the same version of the operating system.

In step 206, differences are identified between one or more properties in the sets of properties from the crash reports. For example, the crash report module 114 may identify differences in contents of the memory stacks between the sets of properties. Identifying the differences may include identifying ones of the external modules that the sets of properties do not have in common. Identifying the differences may include identifying ones of the other applications that the sets of properties do not have in common. Identifying the differences may include identifying ones of the operating systems that the sets of properties do not have in common. Identifying the differences may include identifying portions of the data that the sets of properties do not have in common. For example, the crash report module 114 may determine that the crashes in the crash reports occurred within the operating system as compiled for two different hardware architectures.

In step 208, one or more candidates are identified for a cause of the problem in the application based on the similarities and the differences. For example, the crash report module 114 may analyze the similarities and the differences to identify the candidate cause of the problem in the application. The crash report module 114 may perform a statistical analysis of the properties in the crash reports 108 to identify the similarities and the differences, such as a multi-dimensional clustering algorithm. The crash report module 114 may use types of the properties in the crash reports 108 (e.g., operating system name, operating system version, driver name, driver version, memory location, etc.) as the dimensions of the algorithm.

The candidates may be identified based on a combination of the similarities and the differences. For example, the crash report module 114 may determine that because the crash reports 108 include many different operating system names that the cause of the problem is in a platform independent component of the computing devices 104*a-c*, such as a component that includes platform independent bytecode, scripting language, or markup language. Accordingly, the crash report module 114 identifies candidate causes from the platform independent components that the computing devices 104*a-c* have in common.

In another example, the crash report module 114 may determine that because the crash reports 108 include only one or a few operating systems names that the cause of the problem is in a platform dependent component of the computing devices 104*a-c*, such as a component that includes a natively compiled driver or application program interface. Accordingly, the crash report module 114 identifies candidate causes from the platform dependent components that the computing devices 104*a-c* have in common.

In another example, where the computing devices 104*a-c* report configuration information separate from and/or prior to submitting crash reports, the crash report module 114 can determine that a particular component (e.g., a particular application program interface) that was identified as a possible candidate for the cause of the problem is included on one or more of the computing devices 104*a-c* that did not submit crash reports. Alternatively or in addition, the crash report module 114 may use information from previous crash reports for another problem to determine that computing devices that did not submit crash reports for the current problem have a particular configuration. As a result, the crash report module 114 can analyze the differences and similarities of the possible candidate. For example, the crash report module 114 can determine that the ones of the computing devices 104*a-c* that sent the crash reports 108 have a first version of the application program interface, while the ones of the computing devices 104*a-c* that did not send crash reports have other versions of the application program interface. Accordingly, the crash report module 114 identifies the first version of the application program interface as a candidate for the cause of the problem.

In another example, as a result of determining that the crashes occurred in the same module and/or version of the module, but from the module as compiled for two different hardware architectures, the crash report module 114 may identify candidates for the cause of the crashes as being within code specific to the module at a high level of abstraction. A high level of abstraction may include, for example, a point in a hierarchy of the code for the module below which differences between hardware architectures are included. The crash report module 114 may also use similarities and differences from other combinations of properties for the application, modules, data, and hardware in the computing devices as well. For example, if the crash report module 114 determines that the computing devices reporting the crashes each have a particular amount of memory, such as more than four Gigabytes (GB) of random access memory (RAM) available to applications (even though the crashing application and/or the operating systems at the computing devices do not use the full amount of available memory), then the crash report module 114 may determine that there may be a compiler or hardware level cause of the crash due to use of thirty-two bit pointers and/or storage of absolute memory addresses.

In some implementations, the properties from the crash reports 108 are aggregated. For example, the crash report module 114 can aggregate total numbers of each of the properties for ones of the computing devices 104*a-c* that sent the crash reports 108 and total numbers of each of the properties for ones of the computing devices 104*a-c* that did not send crash reports. The crash report module 114 may then perform the analysis on the totals to identify similarities and differences among the ones of the computing devices 104*a-c* that sent the crash reports 108 as compared to the ones that did not send crash reports and/or the entire set of the computing devices 104*a-c*.

In step 210, a report is generated that includes the candidates. The report may then be sent to another computing device for review by a user. For example, the crash report module 114 can generate the report 116 that includes a list of the candidate components for the cause of the problem and output the report 116 to the computing device 118. The list may include properties of the candidates, such as a type of the component, a name of the component, and/or a version of the component.

In some implementations, the crash report module 114 may generate a graphical representation of the analysis, such as a visual representation of the clustering algorithms that lead to the identification of the candidate components. For example, the crash report module 114 may generate a first visual representation that includes a first level of the clustering algorithm, such as similarities and/or differences in a particular type of component, such as operating systems in use at the computing devices 104*a-c*, or across types of components. The crash report module 114 may generate a second visual representation that includes a next level of the clustering algorithm, such as similarities and/or differences in properties of a particular component, such as versions of the particular application program interface and procedures within the particular application program interface that were accessed.

Figure 3:
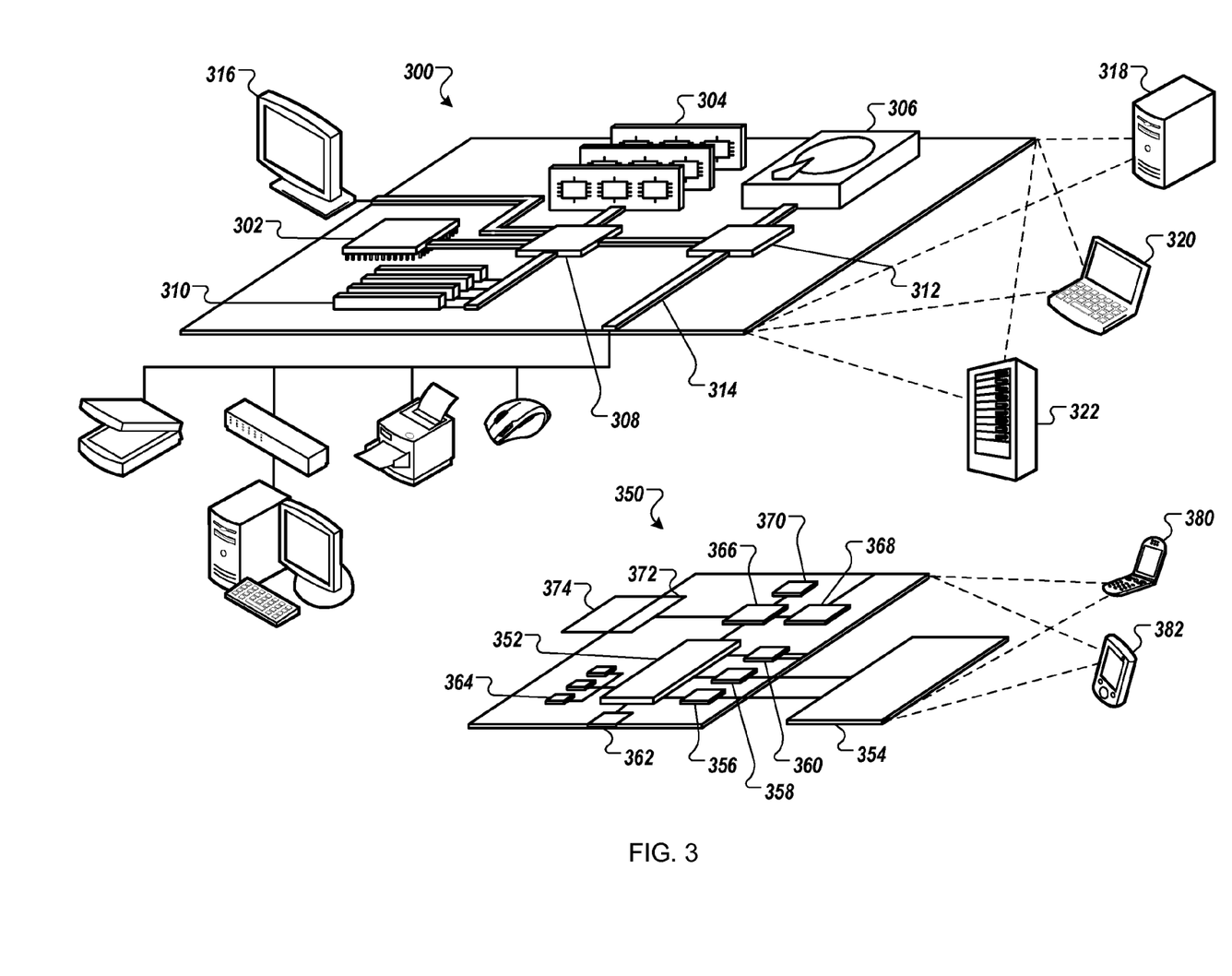
FIG. 3 is a schematic diagram that shows an example of a computing device and a mobile computing device.

FIG. 3 is a schematic diagram that shows an example of a computing device 300 and an example of a mobile computing device that can be used to implement the systems and techniques described here. The computing device 300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 304, the storage device 306, or memory on the processor 302.

The high-speed interface 308 manages bandwidth-intensive operations for the computing device 300, while the low-speed interface 312 manages lower bandwidth-intensive operations. Such allocation of functions is exemplary only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 318, or multiple times in a group of such servers. In addition, it may be implemented in a personal computer such as a laptop computer 320. It may also be implemented as part of a rack server system 322. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a microdrive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. The memory 364 may include, for example, flash memory and/or NVRAM memory (non-volatile random access memory).

An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 364, the expansion memory 374, or memory on the processor 352. In some implementations, the computer program product can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here use personal information about users, the users may be provided with an opportunity to opt in/out of programs or features that use personal information (e.g., system state information, such as contents of memory or instructions executed on a processor by an application in operation at a computing device). In addition, certain data may be made anonymous in one or more ways before it is stored or used, so that personally identifiable information is removed. For example, a user's identity may be made anonymous so that the no personally identifiable information can be determined for the user. In addition, a user's geographic location may be generalized where location information is obtained (such as to a city, zip code, or state level), so that a particular location of a user cannot be determined.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for identifying causes of application crashes, the method comprising:
   receiving crash reports from multiple computing devices resulting from a problem that occurs in an application in operation at the computing devices, wherein the crash reports include sets of properties that describe system states of the computing devices where the problem occurred;
   identifying similarities between one or more properties in the sets of properties from the crash reports;
   identifying differences between one or more properties in the sets of properties from the crash reports;
   identifying one or more candidates for a cause of the problem in the application based on a clustering of the similarities and the differences; and
   generating a report that includes the one or more candidates.

2. The method of claim 1, wherein the sets of properties comprise memory stacks;
   wherein identifying the similarities comprises identifying contents of the memory stacks that the sets of properties have in common; and
   wherein identifying the differences comprises identifying contents of the memory stacks that the sets of properties do not have in common.

3. The method of claim 2, wherein the memory stacks comprise memory stacks of threads in the application other than a thread in which the problem occurred.

4. The method of claim 1, wherein the sets of properties identify external modules accessed by the application;
   wherein identifying the similarities comprises identifying ones of the external modules that the sets of properties have in common; and
   wherein identifying the differences comprises identifying ones of the external modules that the sets of properties do not have in common.

5. The method of claim 4, wherein the external modules comprise one or more of drivers, plug-ins, extensions, and application program interfaces.

6. The method of claim 1, wherein the sets of properties identify other applications in operation at the computing devices;
   wherein identifying the similarities comprises identifying ones of the other applications that the sets of properties have in common; and
   wherein identifying the differences comprises identifying ones of the other applications that the sets of properties do not have in common.

7. The method of claim 1, wherein the sets of properties identify operating systems in operation at the computing devices;
   wherein identifying the similarities comprises identifying ones of the operating systems that the sets of properties have in common; and
   wherein identifying the differences comprises identifying ones of the operating systems that the sets of properties do not have in common.

8. The method of claim 7, wherein the sets of properties identify processor architectures in operation at the computing devices;
   wherein identifying the similarities comprises identifying ones of the processor architectures of the operating systems that the sets of properties have in common; and
   wherein identifying the differences comprises identifying ones of the processor architectures of the operating systems that the sets of properties do not have in common.

9. The method of claim 1, wherein the sets of properties identify data within the application in operation at the computing devices;
   wherein identifying the similarities comprises identifying portions of the data that the sets of properties have in common; and
   wherein identifying the differences comprises identifying portions of the data that the sets of properties do not have in common.

10. A computer-implemented system for identifying causes of application crashes, the system comprising:
    an interface that receives crash reports from multiple computing devices resulting from a problem that occurs in an application in operation at the computing devices, wherein the crash reports include sets of properties that describe system states of the computing devices where the problem occurred;
    a memory that stores the sets of properties from the crash reports; and
    a crash report module that identifies similarities between one or more properties in the sets of properties from the crash reports, identifies differences between one or more properties in the sets of properties from the crash reports, identifies one or more candidates for a cause of the problem in the application based on a clustering of the similarities and the differences, and generates a report that includes the one or more candidates.

11. The system of claim 10, wherein the sets of properties comprise memory stacks; and
    wherein the crash report module identifies the similarities by identifying contents of the memory stacks that the sets of properties have in common, and identifies the differences by identifying contents of the memory stacks that the sets of properties do not have in common.

12. The system of claim 11, wherein the memory stacks comprise memory stacks of threads in the application other than a thread in which the problem occurred.

13. The system of claim 10, wherein the sets of properties identify external modules accessed by the application; and
    wherein the crash report module identifies the similarities by identifying ones of the external modules that the sets of properties have in common, and identifies the differences by identifying ones of the external modules that the sets of properties do not have in common.

14. The system of claim 13, wherein the external modules comprise one or more of drivers, plug-ins, extensions, and application program interfaces.

15. The system of claim 10, wherein the sets of properties identify other applications in operation at the computing devices; and
    wherein the crash report module identifies the similarities by identifying ones of the other applications that the sets of properties have in common, and identifies the differences by identifying ones of the other applications that the sets of properties do not have in common.

16. The system of claim 10, wherein the sets of properties identify operating systems in operation at the computing devices; and     wherein the crash report module identifies the similarities by identifying ones of the operating systems that the sets of properties have in common, and identifies the differences by identifying ones of the operating systems that the sets of properties do not have in common.

17. The system of claim 16, wherein the sets of properties identify processor architectures in operation at the computing devices; and     wherein the crash report module identifies the similarities by identifying ones of the processor architectures of the operating systems that the sets of properties have in common, and identifies the differences by identifying ones of the processor architectures of the operating systems that the sets of properties do not have in common.

18. The system of claim 10, wherein the sets of properties identify data within the application in operation at the computing devices; and     wherein the crash report module identifies the similarities by identifying portions of the data that the sets of properties have in common, and identifies the differences by identifying portions of the data that the sets of properties do not have in common.

\* \* \* \* \*